United States Patent [19]

Carr et al.

[11] Patent Number: 4,644,320
[45] Date of Patent: Feb. 17, 1987

[54] HOME ENERGY MONITORING AND CONTROL SYSTEM

[76] Inventors: R. Stephen Carr, 18527 Rose Ct., West Linn, Oreg. 97068; Julius N. Dalzell, 1532 SE. Jacquelin Dr., Hillsboro, Oreg. 97123; J. Fred Holmes, 9345 NW. Kaiser Rd., Portland, Oreg. 97231; John M. Hunt, 13360 NW. Northrup, Portland, Oreg. 97229

[21] Appl. No.: 651,223
[22] Filed: Sep. 14, 1984
[51] Int. Cl.⁴ ............................................. G08C 19/00
[52] U.S. Cl. .................................. 340/310 A; 340/538
[58] Field of Search .......................... 340/310 A, 538; 364/464, 483; 324/103 R, 116, 113, 114, 115, 142, 310 R

[56] References Cited

U.S. PATENT DOCUMENTS

| | | | |
|---|---|---|---|
| 3,747,068 | 7/1973 | Bruner et al. | 340/151 |
| 3,900,842 | 8/1975 | Calabro et al. | 340/310 A |
| 4,174,517 | 11/1979 | Mandel | 340/310 A |
| 4,206,872 | 6/1980 | Levine | 236/46 R |
| 4,350,980 | 9/1982 | Ward | 340/870.02 |
| 4,401,943 | 8/1983 | Morris | 324/115 X |
| 4,410,883 | 10/1983 | Swiston, Sr. | 340/310 R X |
| 4,418,333 | 11/1983 | Schwarzbach et al. | 340/310 A |

*Primary Examiner*—Jerry W. Myracle
*Attorney, Agent, or Firm*—Chernoff, Vilhauer, McClung & Stenzel

[57] ABSTRACT

A home energy monitoring and control system for monitoring the electrical energy usage of a plurality of appliance loads. The system includes an energy monitor unit for each appliance load which plugs into a standard AC wall outlet and monitors power consumption and also has a power line transmitter/receiver for communicating with a master control station. The master control station receives energy usage data from each of the monitor units and stores the data for display in various user-selectable formats.

12 Claims, 15 Drawing Figures

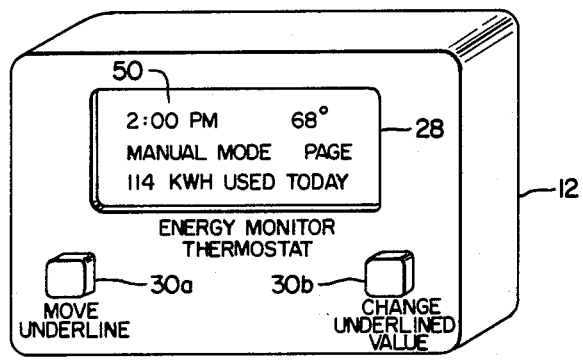

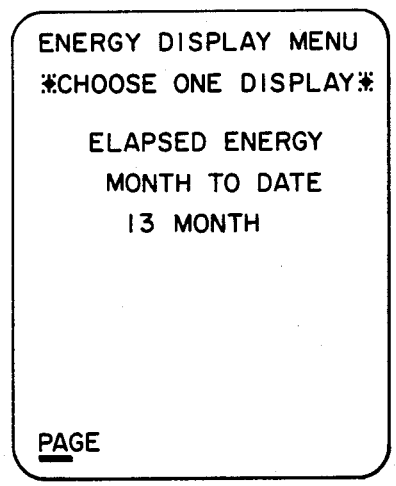
FIG. 12
ENERGY DISPLAY MENU
*CHOOSE ONE DISPLAY*
ELAPSED ENERGY
MONTH TO DATE
13 MONTH
PAGE
ELAPSED ENERGY SINCE
SUNDAY    JANUARY  01
 12:00 AM
   LOAD      KWH
     1        0
     2        0
     3        2
     4        3
     5        4
   TOTAL      9
PAGE       RESET
FIG. 13
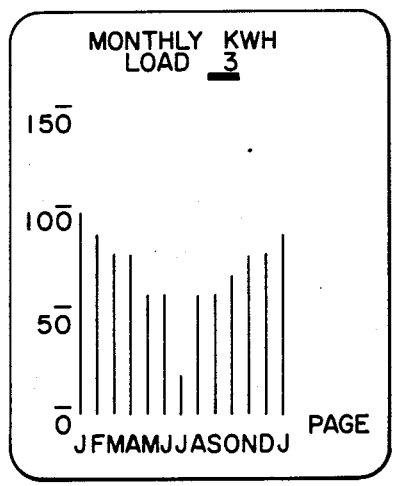
FIG. 14
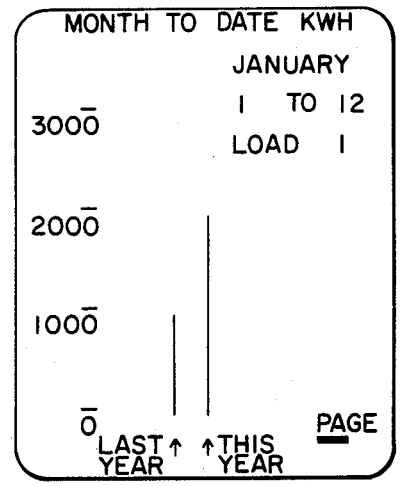
FIG. 15

HOME ENERGY MONITORING AND CONTROL SYSTEM

BACKGROUND OF THE INVENTION

The following invention relates to a system which may be connected to conventional AC wiring for monitoring electrical energy usage of individual appliances used in a residence and for displaying such information in a plurality of formats selectable by a user.

With the rising cost of home energy use, especially electrical power, it has become desirable to know the quantity of electrical power used by various household appliances so that inefficient uses of electricity can be eliminated. Since home budget planning to an extent depends upon the amount of energy used during different periods such as time of day, day of the week, or season of the year, it would be advantageous to know which time periods were responsible for the maximums and minimums of energy usage, and which particular appliances contributed most heavily during those particular periods to the total amount of energy used. While it is possible to obtain a monthly, daily or weekly total for aggregate home energy use by reading the outside utility meter, such a practice is awkward and cumbersome. Furthermore, the only information that can be obtained from the utility meter is the total energy use of the entire residence. Obviously it cannot be determined from the utility meter which particular appliances contribute most heavily to the total amount of energy usage within any given time frame.

In the past, systems have been available for automatically controlling certain household appliances from a central location. These systems typically use a power line modem which is a transmitter/receiver capable of operating over conventional AC 120/240-volt wiring. In addition to the modem, these systems include a switch for controlling the operation of the appliance which is activated or deactivated by a central control unit. Examples of this type of system are shown in the U.S. Pat. Nos. 4,174,517 to Mandell and 4,418,333 to Schwarzbach. In both of these systems a control unit may be programmed to initiate certain functions within various appliances depending upon the time of day. For example, lights may be programmed to automatically turn on at dark and a coffee maker may be programmed to automatically turn on at a given hour in the morning. Neither the Schwarzbach nor the Mandell system, however, provides any means for monitoring energy usage of the various appliances or devices connected to either system.

Residential energy monitoring systems have been proposed for use by utility companies for remotely and automatically monitoring the aggregate household energy usage of a plurality of homes within a given area. These systems are intended to obviate the need for "meter readers" who personally inspect the utility meters of residences and record monthly or bimonthly energy use. Remote automatic meter reading systems typically transmit power usage information over telephone lines, power lines or by radio communication link. The energy metering devices proposed for these systems, however, consist usually of a retrofit device or circuit intended to be used with or connected to the utility meter located outside the dwelling. There are, for example, optical encoders which "read" the decade dials of a conventional utility grade power meter and such a system is shown in Calabro U.S. Pat. No. 3,900,842. Another type of device uses a digital counting technique responsive to the shaft revolutions of a conventional utility power meter as shown in Bruner U.S. Pat. No. 3,747,068. Another type of system, disclosed in Ward U.S. Pat. No. 4,350,980, uses an optical method for scanning the revolutions of the meter wheel of a standard electric meter and generating digital pulses which are then induced in the electric power cables of the meter to provide data at existing power outlets within the home which may be recorded by a receiving device plugged into an outlet. The principal drawback of all of the foregoing systems is that the energy consumption data is extracted solely from the utility meter, and as such does not provide any information regarding energy consumption of individual appliances or units within the household.

What is needed, therefore, is a system capable of operating in conjunction with standard AC household wiring such that energy use information from selected appliances may be transmitted over the internal building wiring to a master control station, and including a metering device for each of the appliances which is capable of measuring power usage independent of the outside utility meter.

SUMMARY OF THE INVENTION

The present invention is a home energy monitoring and control system capable of monitoring and controlling individual loads and transmitting energy usage information over the conventional AC wiring of a residence or other building to a master control station which may then display the energy usage information in various formats according to the desires of the user. An "appliance load," as that term is used throughout this discussion, includes any device which consumes electrical energy. As such, the term includes conventional appliances plugged into household wall outlets as well as the heating-cooling system, water heater, and/or central air conditioning.

Each appliance load to be monitored may plug into an energy monitor unit via a standard AC outlet and the energy monitor unit may have a wall plug which is, in turn, connected to a household wall AC outlet. The monitor may also be hardwired into the appliance load or may be coupled to the load through the circuit breaker box as will be explained hereinbelow. Each individual monitor unit includes a metering circuit for deriving a signal representing the power consumption of the particular appliance load plugged into the unit. It may also include a microprocessor and a memory (microcomputer) for calculating energy consumption (watt-hours) by integrating the power (watt) readings. The power or energy readings may be stored for display. The monitor unit may also have auxiliary inputs and outputs for controlling the operation of the appliance loads, and, optionally, a display screen for displaying either power or accumulated energy usage. The monitor unit also includes a transceiver capable of communication over the AC wiring to a master control station.

In another embodiment of the invention, the monitor unit may be physically incorporated into the circuit breaker at the household circuit breaker panel. Thus, appliance loads which have a "dedicated" circuit breaker may be connected directly to the system at this convenient access point. Alternatively, the monitor unit may be "hardwired" into a particular appliance. The particular point of connection is not critical since the monitor units as described herein are connected in series between the appliance load and the AC line input.

The metering circuit is fully electronic, requiring no mechanical or moving parts. Voltage information is derived from a voltage divider connected between the AC "hot" line and the common line from the wall outlet. Current information is derived through the use of a current sensing resistor connected between the "common" input and output lines. It may also be derived from a current transformer. The aforementioned voltage and current signals are multiplied together in a four quadrant multiplier to obtain a signal representing the product of the voltage and current signals, which is, in turn, proportional to the power consumption of the appliance.

The output of the four quadrant multiplier includes a 120 Hz term which is filtered from the composite product signal in a low-pass filter leaving only the average power signal term. The power signal may be read at regular intervals and the readings accumulated in a memory included with each monitor unit. These data represent the accumulated energy use. The total energy use may be later transmitted over the household internal AC wiring and for display at a master control station. The energy monitor unit includes a transceiver, or modem, capable of communication over 60-Hz AC house wiring. Each of these modems communicates with a second modem at a master control station which may be located, for example, at the central thermostat, where it may also control the central heating and cooling for the residence.

The master control station controls the collection of data from the individual energy monitor units and stores that data for display in various formats selected by the user and selectively controls the operation of certain units. The master control station includes a display screen which may be of the liquid crystal display (LCD) type, and a microprocessor for collection, storage and manipulation of the energy use data from the various energy monitor units.

The display may consist of several "pages" of text controlled by a cursor control and a sequencing control. The cursor control moves an index marker or cursor sequentially through a plurality of selected data items displayed on the screen. The sequencing control sequentially advances an item preselected by the cursor control through a predetermined range of values.

In order to accumulate data for display, the master control station periodically interrogates each of the energy monitor units, and extracts from those units their accumulated energy consumption information. These values are stored in a nonvolatile memory section of the master control station so that even in the event of a power failure, accumulated data is not lost.

If the master control station is located at the thermostat panel of the household, the station may incorporate the heating and cooling function normally performed by the thermostat control. The master control may, therefore, include a temperature-sensing input and the system may also be programmed to automatically adjust the thermostat control at designated times of the day.

This scheduling feature, along with the energy monitoring capability of the system, enables an energy consumer to judge the efficiency and effectiveness of his conservation program. Many factors may camoflage assumed energy savings such as weather variation, heavy use of certain selected appliances, and complex rate structures. With the capability to accumulate and display data for individual appliance loads over preselected intervals of time, however, the consumer may be able to more efficiently schedule the use of electrical energy and, hence, stay within his conservation program.

It is a primary object of this invention to provide an energy monitoring system for monitoring, from a central location, the electrical power consumption of a plurality of appliances or devices connected to standard AC household wiring, without the need for any internal rewiring thereof.

A further object of this invention is to provide an energy monitoring system which includes an energy metering circuit which is simple, accurate, and inexpensive, and requires no mechanical or moving parts.

Yet a further object of this invention is to provide an energy monitoring system capable of two-way communication over standard household AC wiring, with a master control station capable of displaying energy usage in various user-selectable formats.

A still further object of this invention is to provide an energy monitoring system which may be connected to the thermostatic controls of a building or residence, and where the operation of the thermostat may be selectively programmed by the user.

Yet a further object of this invention is to provide an energy monitoring system which is entirely plug-compatible with the standard AC household wiring of a building or residence.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 6 is a perspective view of the exterior of the master control station shown in FIG. 1, with an exemplary data display depicted on a display screen.

FIG. 7 is a page of the display screen shown in FIG. 6 showing time of day and temperature.

FIG. 8 is another page of the display screen showing outdoor and indoor temperatures and the status of the heating/cooling unit.

FIG. 9 is another page of the display screen showing a weekday temperature schedule.

FIG. 10 is a page of the display screen showing a weekend temperature schedule.

FIG. 11 is a page of the display screen showing a weekly schedule of temperature programs.

FIG. 12 is a page of the display screen depicting an energy display menu.

FIG. 13 is a page of the display screen showing total energy use for a plurality of appliance loads.

FIG. 14 is a page of the display screen showing monthly kilowatt hour load totals in bar graph form for a particular appliance load.

FIG. 15 is a page of the display screen showing comparative kilowatt hour usage for a selected appliance load.

DETAILED DESCRIPTION OF THE INVENTION

Figure 1:
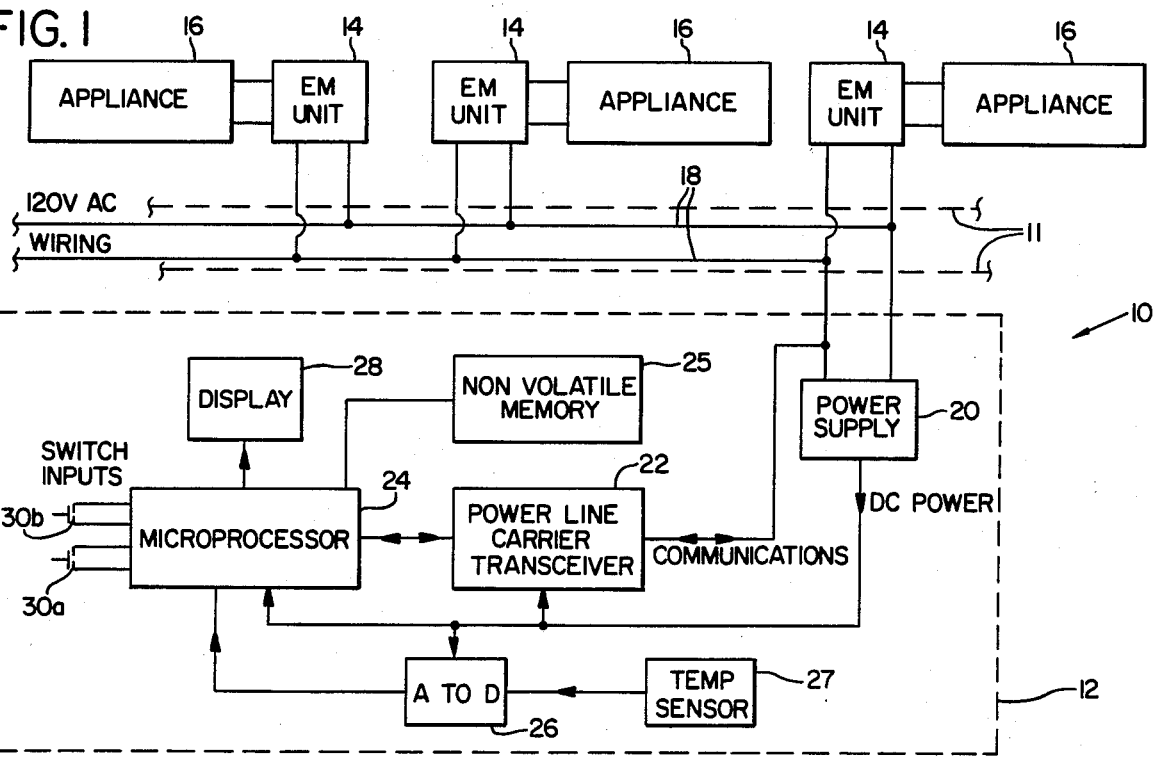
FIG. 1 is a block schematic diagram of the home energy monitor and control system that comprises the present invention.

Referring now to FIG. 1, an energy monitoring and control system 10 comprises a master control station 12 and a plurality of energy monitoring units 14. The energy monitoring units 14 are plugged into conventional 120/240-volt AC wiring lines 18 and a plurality of appliances 16 are plugged into the monitoring units. The master control station 12 is likewise connected to the AC lines 18. Dashed lines 11 schematically represent interior walls of the building.

The master control station 12 includes a power supply 20 for supplying DC power to a power line carrier transceiver 22 and to a microprocessor 24. DC power is also supplied to an analog-to-digital converter 26. A temperature sensor 27 which may consist of both an inside and an outside thermometer is connected to analog-to-digital converter 26. The output of the A to D converter is connected as an input to microprocessor 24. Microprocessor 24 is connected to a nonvolatile memory unit 25 and to a display unit 28 which may consist of a liquid crystal display (LCD) screen. Inputs to the microprocessor include a pair of switches 30a and 30b which comprise a selectively-operable cursor control 30a and a selectively operable sequencing control 30b, respectively, whose operation is explained below.

Figure 2:
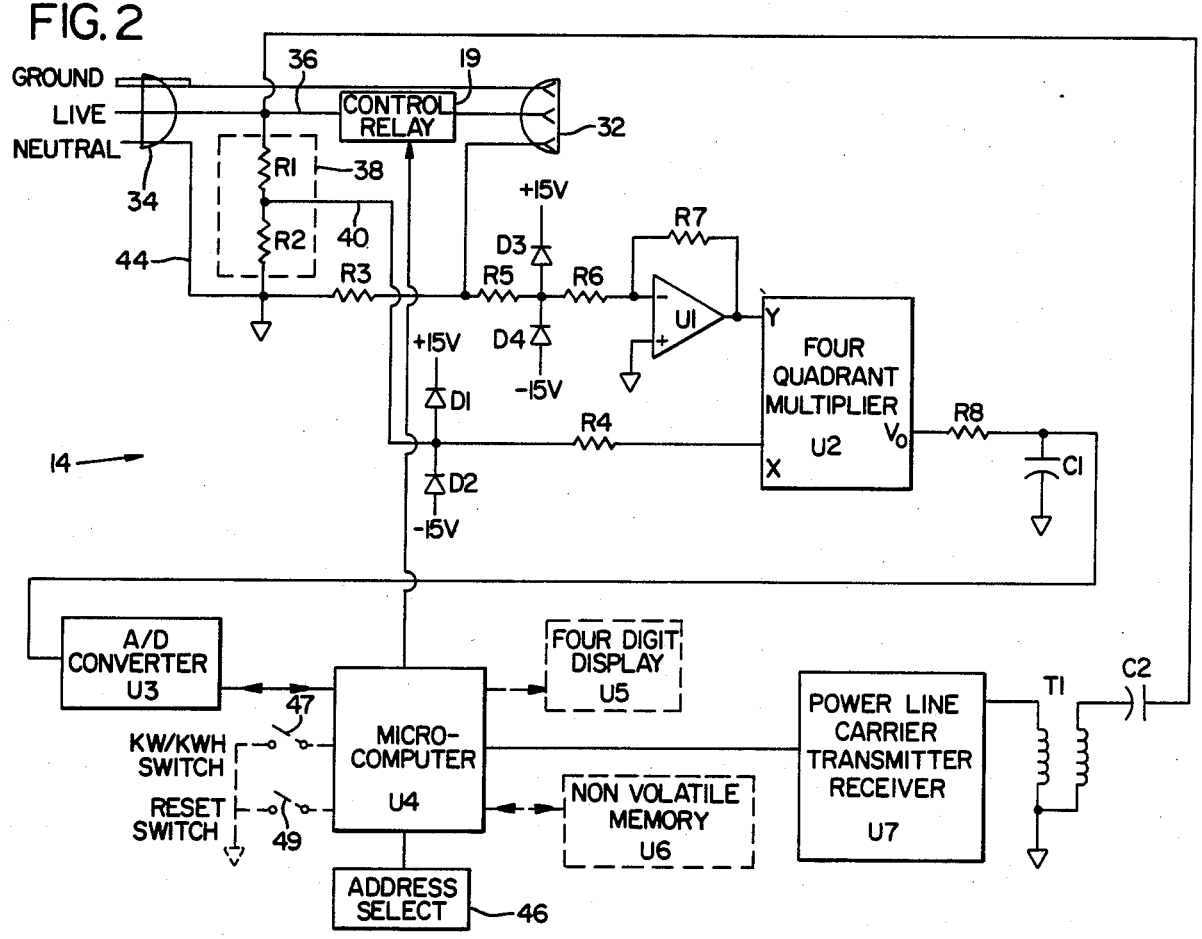
FIG. 2 is a block schematic diagram of an energy monitor unit which is a component part of the system depicted in FIG. 1.

Each energy monitor unit 14, as shown in FIG. 2, includes a standard 120-volt outlet 32 for each appliance load 16 to be measured. Each energy monitor unit 14 also has an AC standard wall plug 34 which plugs into a conventional household wall outlet (not shown) for connection to the household wiring 18. In the "live" or "hot" line of outlet 32 is a relay control 19 which may be available to turn off or turn on selected appliances upon instruction from the master control station 12. For larger appliance loads such as a water heater, heat pump, or central air conditioning system the energy monitor unit is "hardwired" to the appliance, it being understood that the connection between the AC line and the unit are the same as those depicted in FIG. 2, although the plugs and outlets are omitted.

Connected to the "live" or "hot" line 36 of the house wiring is a voltage divider 38. Voltage divider 38 comprises resistors R1 and R2. A tap line 40 from voltage divider 38 is connected to a pair of diodes D1 and D2. Diodes D1 and D2 are clipping diodes which protect the voltage on line 40 from excessive levels due to instantaneous power surges.

Connected to the neutral line 44 from the household wiring outlet (not shown) is a current sensing resistor R3. Since R3 is connected between the neutral lines of outlet 32 and plug 34, it will develop a signal that is proportional to the load current drawn by the appliance connected to the outlet 32. The value of the load current flowing through R3 will be proportional to $I\cos(wt+\theta)$ where w is the angular frequency of the power line, t is time and $\theta$ is the phase angle difference between the load current and voltage.

The signal developed by the voltage divider 38 will be proportional to the voltage applied to the load, having been appropriately scaled by the chosen values of R1 and R2. The voltage signal is represented by the expression $V\cos(wt)$. The voltage signal is appropriately scaled further by R4 and appears as the "X" input to a four quadrant multiplier U2.

The voltage developed by the current sensing resistor R3 is connected to an operational amplifier U1 whose gain is controlled by resistors R5, R6 and R7. This gain control appropriately scales this voltage which is proportional to the current signal for input to the four quadrant multiplier U2, which appears as the "Y" input to U2. The current output circuit from R3 also includes a surge protection circuit consisting of a pair of clipping diodes D3 and D4 whose function is the same as that described in connection with diodes D1 and D2.

The four-quadrant multiplier U2 multiplies the voltage and current signals respectively at the "X" and "Y" inputs to produce a signal representing instantaneous power. The product of the "X" and "Y" inputs is of the form $(VI/2) \cos \theta + (VI/2) \cos (2wt+\theta)$. Since only the first term of this product represents average real power, the second term is removed by a low-pass filter consisting of resistor R8 and capacitor C1. A typical cutoff frequency for this filter is approximately 10 Hz. The output of the low-pass filter, therefore, is the true average value of the power used by the particular appliance load 16 plugged into the outlet 32. Thus, the circuit measures the true power regardless of line voltage variation or phase angle value. The output of the low-pass filter is connected to an analog-to-digital (A/D) converter U3 to place it in digital format. The output of the A/D converter U3 is connected to a microcomputer U4, which may be, for example, an Intel 8048, and which may be internally programmed to integrate the values of average power from U3 to yield a cumulative total of energy usage which is stored in its memory. This is accomplished in the microcomputer U4 by allowing the output of the A/D converter U3 to be read at a fixed rate (for example 60 times per second), and to store the cumulative sum of all such readings in the microcomputer memory.

U4 may be optionally connected to a pair of switches 47 and 49, respectively, which may be selectively set by the user to display on four digit optional display U5, either the total energy used expressed in kilowatt hours or the power expressed in kilowatts. Another optional component for the units 14 includes a non-volatile memory U6. These options would be especially useful in the event that the monitors 14 were used as "stand alone" units, that is without connection to a central processing station.

The output of the microprocessor U4 is connected to a power line carrier transceiver U7 which is capable of transmitting and receiving data over conventional 60 cycle AC wiring lines 18. A transformer T1 couples the transceiver U7 to the "live" line between the outlet 32 and the wall plug 34, and a capacitor C2 blocks the power line frequency while allowing the carrier frequency of the transceiver U7 (typically 125 kHz) to pass. An address selector switch 46 provides a digital code unique to each unit 14 for communication via transceiver U7 with the master control station 12.

Typical component values and part numbers which may be used with the aforementioned circuit are listed in the table below.

| | |
|---|---|
| R1 | 23.2K |
| R2 | 1.0K |
| R3 | 0.01 ohms |
| R4 | 10K |
| R5 | 1.32K |
| R6 | 1.32K |
| R7 | 23.2K |
| R8 | 160K |
| Diodes D1, D2, D3, D4 | 1N914 |
| C1 | 0.1 MF |
| C2 | .022 MF |
| T1 | 14:1 turns ratio, 10 ohm output impedance at 125 kHz, 10 UL-001 (Toko America) |
| U1 | op amp, LF 353A (National Semiconductor) |
| U2 | 4 quadrant multiplier AD533 (Analog Devices) |
| U3 | A/D converter, ADC 0844 (National Semiconductor) |
| U4 | microprocessor 8048 (Intel) |
| U5 | four digit display NSM 4000A (National Semiconductor) |
| U6 | nonvolatile memory X2444 (XICOR) |
| U7 | power line carrier transmitter/receiver LM1893 (National Semiconductor) |

An alternative to the current sensing resistor R3 is a current transformer (not shown). Such a device includes a primary coil located in series with the neutral line 44, a core, either magnetically permeable or an air core, and a secondary winding having one end connected to ground and the other end connected to the input of U1. Resistors R5 and R6 would be omitted.

As an alternative to the plug-in version of the energy monitor unit 14 as shown in FIG. 2, the unit could be packaged to be inserted into the circuit breaker panel of a conventional household breaker box. Since the unit 14 is connected in series between the house wiring and the appliance load 16, it could be placed in series with a conventional circuit breaker (not shown). In such a configuration with space at a premium, the display U5 and selector switches 47 and 49 would be omitted as would a separate nonvolatile memory U6. The remaining components occupy relatively little space and could be fitted within the confines of a circuit breaker. This embodiment would be especially useful in the case of an appliance load having a "dedicated" circuit breaker such as an electric water heater, and presents a more convenient alternative to a hardwired monitor unit for this type of appliance.

Figure 3:
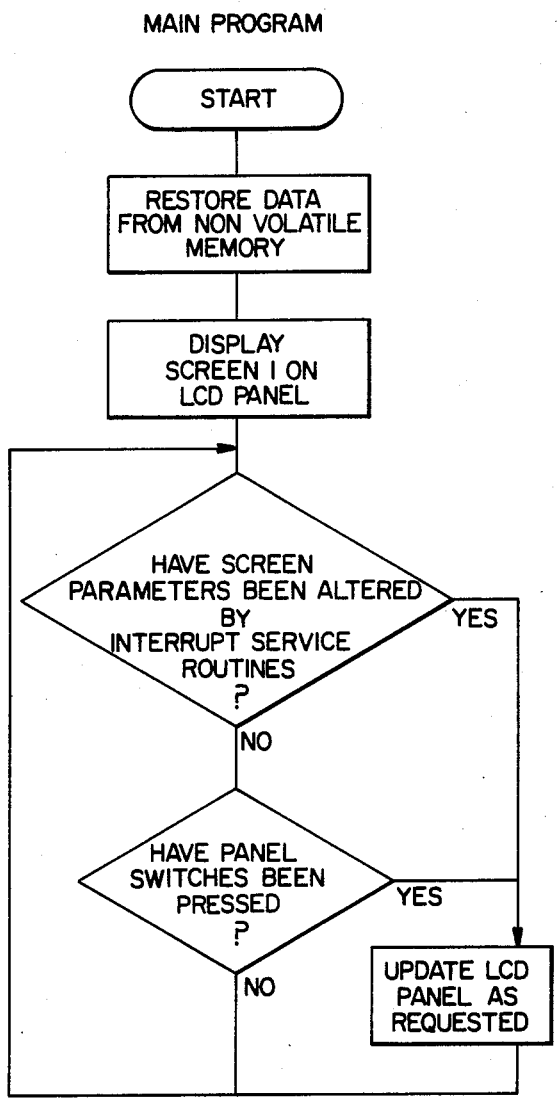
FIG. 3 is a flow chart diagram of the main microprocessor program for the master control station shown in FIG. 1.
Figure 4:
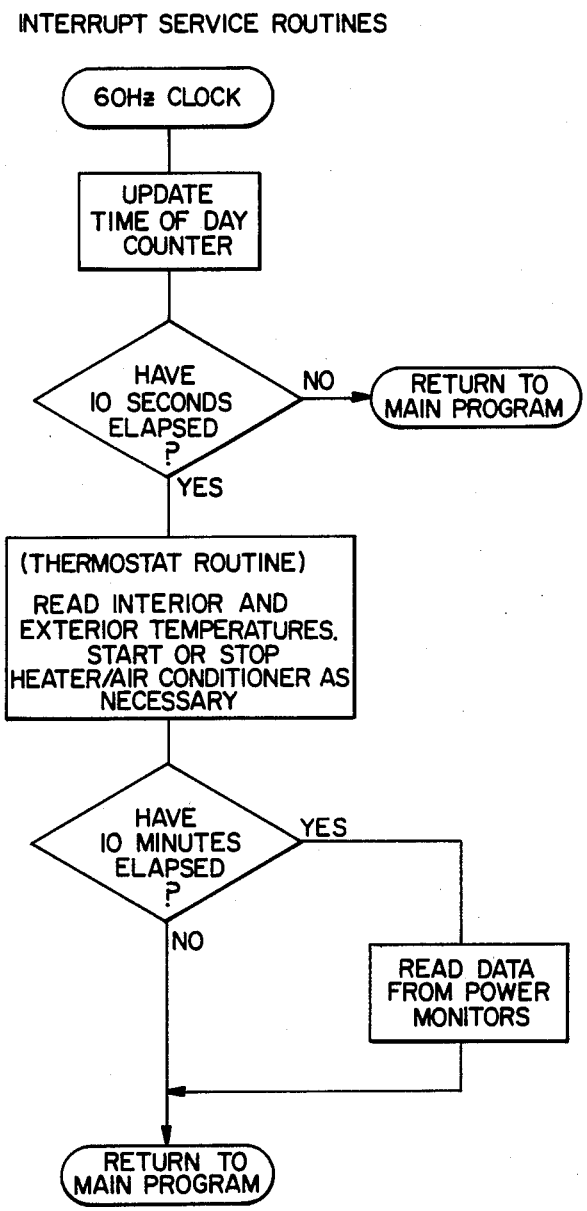
FIG. 4 is a flow chart diagram of an interrupt service routine used by the master control station of FIG. 1.
Figure 5:
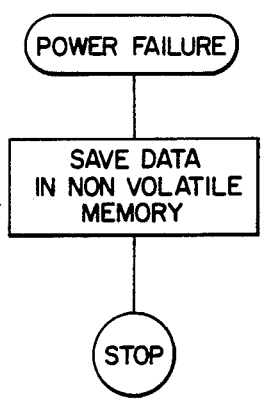
FIG. 5 is a flow diagram of an interrupt service routine used in the event of a power failure at the master control station.

FIGS. 3, 4 and 5 illustrate, in flow chart form, the programming of the microprocessor 24 included in the master control station 12. As illustrated in FIG. 3, the main program restores data from the nonvolatile memory 25 upon start-up and displays screen 1 on the LCD panel of the display unit 28. Next, depending upon either the altering of screen parameters by interrupt service routines, or the selection of display information different from that which is shown in screen 1, the microprocessor merely updates the LCD display of the display unit 28 as requested. The last LCD display remains on the screen unless interrupted by a change in the panel switches or by an interrupt service routine.

FIG. 4 shows an interrupt service routine which is regulated by a 60-cycle clock (not shown) included in microprocessor 24. This clock updates the time of day counter upon each pulse output of the 60-cycle clock. After 10 seconds have elapsed, the microprocessor reads any temperature inputs from the temperature sensor 27 as converted to digital form by the analog-to-digital converter 26. In the event that the temperatures sensed are of a magnitude sufficient to trigger a thermostat, that is, they are above or below a preset temperature chosen for initiation of the heating/cooling unit, the master control unit may activate or deactivate the heating/cooling unit by sending the appropriate message over the power lines through its power line transceiver 22. Since the heating/cooling unit is an appliance which may include one of the energy monitor units 14, it may be controlled through its control relay 19. Every 10 minutes the master control station 12 reads data from the individual energy monitor units 14 by initiating an interrogation signal over the power line carrier transceiver 22. This interrogation signal is received and decoded by each of the power line carrier transceivers U7, included in each of the energy monitor units 14. After data has been read from each of the energy monitor units 14, the microprocessor 24 returns to its main program.

FIG. 5 illustrates that, in the event of a power failure, the microprocessor 24 is programmed to automatically save any data existing in its nonvolatile memory unit 25. Thus, the maximum amount of data that can be lost in the event of a power failure is limited to the unread data stored in the memory units U6 of the respective energy monitors 14. Since these units are read once every ten minutes, a maximum of 10 minutes worth of data is subject to loss.

FIGS. 6 through 15 include examples of selectable formats for data display of monitored energy usage, time, or temperature. In FIG. 6, the master control station 12 includes a screen 50 for a display unit 28. The front panel of master control station 12 also includes switches 30a and 30b which are the cursor control (MOVE UNDERLINE) and sequencing control (CHANGE UNDERLINED VALUE), respectively. The cursor control 30a appears as an underline appearing below selected data values displayed on the screen 50. Each time the cursor control button 30a is pressed, the control advances sequentially from one data line item to the next. With the cursor control 30a placed under a specific data item, pressing the sequencing control 30b will advance that data item through a range of preselected values. For example, FIG. 7 displays a data page including a desired temperature setting of 50 degrees. By moving the cursor control 30a underneath the desired Fahrenheit degree designation, the desired temperature setting may be advanced to different values by pressing the sequencing control 30b. The range of values for Fahrenheit temperature settings could range, for example, from 40 degrees to 85 degrees. Similarly, time of day information with corresponding temperature settings may be entered in the microprocessor by the cursor control 30a and sequencing control 30b so that the thermostat will turn on and turn off at the appropriate preselected time. The means for programming a microprocessor in this way are well known in the art as illustrated, for example, by Levine U.S. Pat. No. 4,206,872. As shown in FIG. 10, the program can be modified to include both a weekday and a weekend schedule to be followed. The schedule may also be displayed on the screen of the display unit as shown in FIG. 11.

The screen format or type of display available may be changed by moving the cursor control 30a under the "PAGE" entry and pressing the sequencing control 30b until the desired display page appears.

FIGS. 12 through 15 show various display options available for displaying selected or total energy usage. FIG. 12 is a menu page which includes displays available for elapsed energy from a certain preselected date, energy used during the particular month to date for a plurality of loads, and comparative energy usage over a 13 month period. Examples of these displays are shown in FIGS. 13 through 15, respectively.

The particular means for constructing a microcomputer such as an Intel 8048 for performing the above-described display tasks in response to commands from a cursor control such as control 30a and a sequencing control such as control 30b are well-known in the art. Other display formats could be chosen for displaying cumulative power measurements obtained from each of the energy monitor units 14, according to the desires of the user.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An energy monitoring system for use with standard 120/240-volt AC wiring for a plurality of appliance loads adapted to be connected to said wiring comprising:
   (a) a plurality of energy monitor means connected between each of said appliance loads and a source of electrical power carried by said wiring for measuring the total amount of electrical energy used by said appliance loads over a predetermined period of time and including first transceiver means connected between each of said monitor means and an input to said wiring for communicating with a master control station; and
   (b) a master control station including second transceiver means connected to said wiring for communicating with each of said first transceiver means, and display means for selectively displaying the electrical energy use measured by each of said monitor means.

2. The system of claim 1 wherein said master control station includes a selectively operable cursor control and a selectively operable sequencing control wherein the cursor control moves sequentially through a display of preselected items displayed on the display means and the sequencing control moves sequentially through a preselected range of values for each item so displayed when selected by the cursor control.

3. The system of claim 1 wherein said master control station further includes a thermostatic control and at least one input from a temperature sensor and wherein one of said appliances is a heating/cooling unit responsive to commands from said master control unit.

4. The system of claim 1 wherein each of said monitor means comprises:
   (a) means for deriving a signal proportional to the voltage supplied to said appliance load from said power source;
   (b) means for deriving a signal proportional to the current drawn by said appliance load from said power source; and
   (c) multiplier means connected to the outputs of said voltage signal means and said current signal means, respectively, for multiplying said signals together, said multiplier having an output circuit for deriving a signal representing the power utilized by said appliance load.

5. The system as claimed in claim 4 wherein said voltage signal means comprises a voltage divider and said current signal means comprises a current sensing means for deriving a signal proportional to the load current.

6. The system as claimed in claim 5 wherein said multiplier means is a four-quadrant multiplier and said output circuit is a low-pass filter.

7. The system of claim 4, further including logic circuit means for deriving a signal representative of the energy usage of said appliance load and means for storing said signal in a memory.

8. The system of claim 7 wherein each of a plurality of said logic circuit means and said memory means are associated with each of said monitor means, respectively.

9. The system of claim 8 wherein each of said memory means is periodically interrogated by said master control station and data representing the energy usage of each of said appliance loads is transmitted to said master control station.

10. The system of claim 9 wherein said master control station includes memory means for storing said energy usage signals and further includes means for selectively displaying different ones of said signals indicative of total energy use over preselected intervals of time of differing ones of said appliances.

11. The system of claim 4 wherein said voltage signal means and said current signal means includes surge protection means for protecting the inputs to said multiplying means from electrical power surges.

12. The system of claim 11 wherein said protection means includes pairs of clipping diodes.

* * * * *